United States Patent [19]

Dieckhoff

[11] 4,131,346
[45] Dec. 26, 1978

[54] PROJECTOR

[76] Inventor: Rolf Dieckhoff, Marienstrasse 26, D-7050 Waiblingen, Fed. Rep. of Germany

[21] Appl. No.: 825,635

[22] Filed: Aug. 18, 1977

[30] Foreign Application Priority Data

Sep. 7, 1976 [DE] Fed. Rep. of Germany ....... 2640227

[51] Int. Cl.² ...................... G03B 31/00; G03B 21/16; G03B 21/28
[52] U.S. Cl. ........................................ 353/15; 353/61; 353/70; 353/77
[58] Field of Search ....................... 353/69, 70, 77, 61, 353/15

[56] References Cited

U.S. PATENT DOCUMENTS

| | | | |
|---|---|---|---|
| 1,199,460 | 9/1916 | Featherstone | 353/70 |
| 3,507,571 | 4/1970 | White | 353/70 |
| 3,985,430 | 10/1976 | Steiner | 353/61 |
| 3,997,258 | 12/1976 | Omi | 353/77 |
| 4,002,408 | 1/1977 | Amma | 353/70 |

Primary Examiner—Steven L. Stephan
Attorney, Agent, or Firm—Allison C. Collard; Thomas M. Galgano

[57] ABSTRACT

A projector for projecting a successive series of pictures and, in particular, an audiovisual information device, includes a housing, a projector disposed within the housing and a projection face which is provided in close proximity to the rear side of the housing for azimuthal projection. The projector face can be viewed by at least one window opening provided on the front side of the housing and the projector is arranged outside of the viewing range between the window opening and the projection face. The projector has a projection axis which is disposed at an angle with respect to the optic axis of its lens. The projector is especially suitable for both indoor and outdoor use.

14 Claims, 3 Drawing Figures

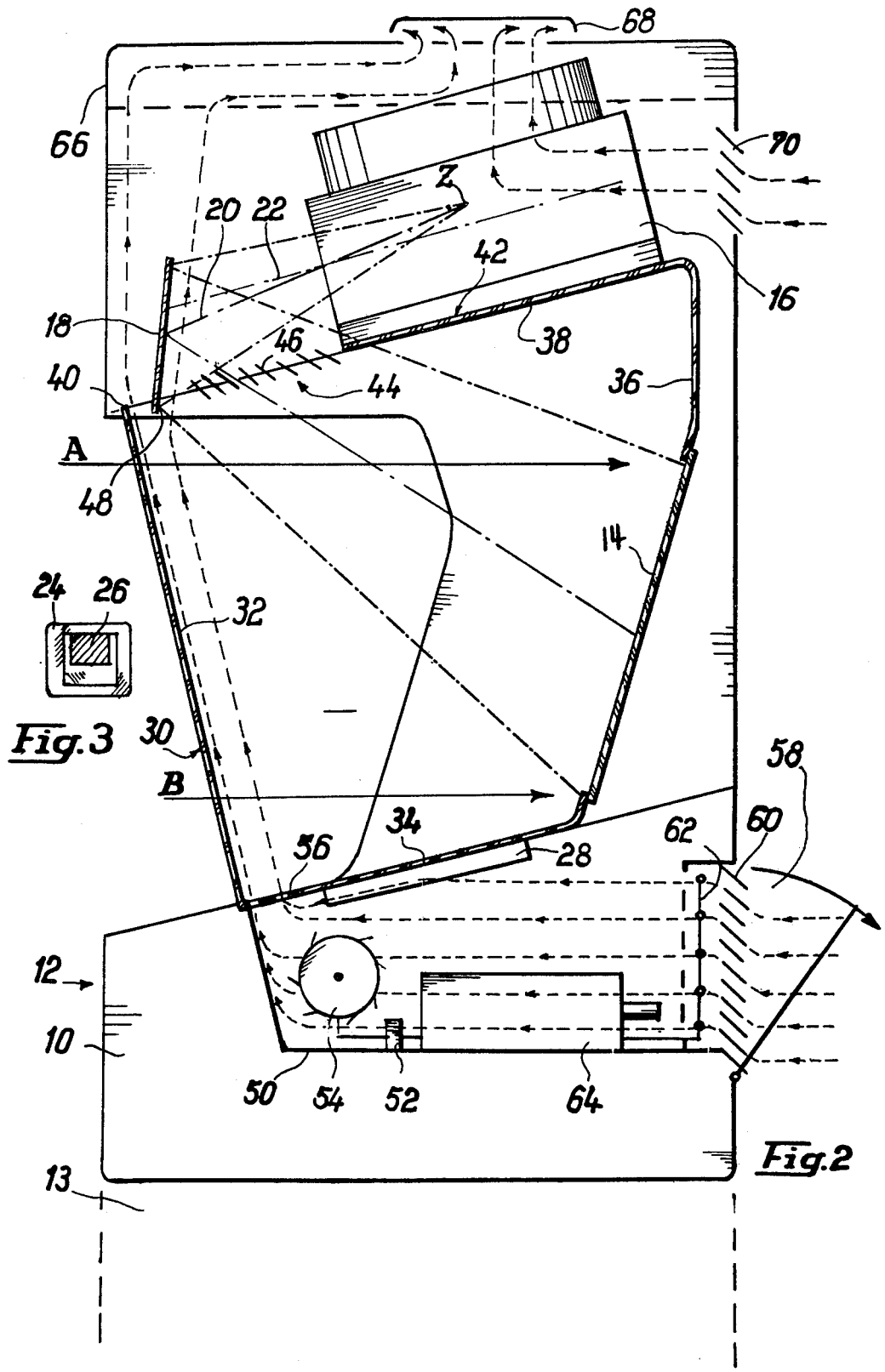

PROJECTOR

The invention relates to a projector for projecting a successive series of pictures and more particularly, it relates to an audiovisual information device having a housing, a projector disposed within housing and a projection face or screen which is provided in close proximity to the rear side of the housing for azimuthal or top projection and which can be viewed by at least one window opening provided on the front side of the housing, with the projector being arranged outside of the viewing range between the window opening and projection face.

When a strong daylight influence is present, difficulties often occur in motion picture devices because the brightness from the outside counteracts the light density of the projection light from inside of the projector. Thereby, a large portion of the projection light is held back due to the coating density of the projection screen. Commercially available projection lamps do not suffice to alter this light density ratio, while light sources having a higher capacity generate a problem because of heat generation, so that an intensive cooling system must be provided.

Therefore, it had been suggested to provide projectors of the aforementioned type, with projection faces for azimuthal or top projection. However, in order to meet the requirement for the path of projection rays, a relatively large space is required, as a result of which a device is provided which is esthetically unpleasant, due to the arrangement of the projector and the provision of a plurality of deflection surface mirrors for the projection rays which are housed in a trough-like housing segment which is open at the top, and are mounted beneath or in front of the projection face. In view of this arrangement, the projection face must be arranged in such a way that it inclined forwardly, so as to prevent distortion of the picture. Therefore, and also to hide the technical elements housed in the trough-like housing segment from the viewer, such devices can only be installed at a relative height, that is, the view onto the projection face must run obliquely in an upward direction onto the projection face. Hence, in an arrangement which is mounted in open space the view would be directed to a particular light background if no sufficiently large screening or shielding is provided.

It is therefore an object of the instant invention to provide a projector of the aforementioned type which is relatively compact, aestetically pleasing, can be manufactured at relative low cost, and which can be used within closed rooms or in open spaces without requiring screens or shields to protect against interfering lights. In particular, the device should be such that no unusual or even unpleasant angle of view is forced upon the viewer. Thereby, neither an interference with respect to the right angularity of the projected picture should occur, nor a deviation in lateral direction, but nonetheless a restraint on the picture area by the technical elements generating the picture should be prevented. Finally, it should be possible to achieve a best possible exactness of the projected picture by a precise simple assembly of all of the technical elements contributing to generate the picture.

The inventive object of the invention consists essentially in that the projection axis of the projector includes an angle with respect to the optical axis of the lens.

In accordance with the present invention, an audiovisual information device is provided which includes a housing, a projection face, which is disposed adjacent to, and is inclined upwardly and rearwardly toward, the rear wall of the housing, a projector which is positioned above the projection face and adjacent to the rear wall of the housing in such a manner that the path of rays is directed towards the front side of the housing, an inclined deflecting surface mirror provided at the front upper edge of the housing which deflects the path of rays from the projector against the projection face, and a window opening which is provided beneath the deflection mirror in the front side of the housing.

In a further advantageous embodiment, the window openings extend beyond the side edges of the front side of the housing and into the side faces thereof, with the window opening being preferably continued to a point in close proximity to the plane of the projection face. It is also particularly advantageous to cover the window openings by means of a clear inspection glass, so that the housing is closed on all sides. In this case, it is particularly desirable that a plastic support element (for example, made of acrylic resins) is inserted into the housing as one unitary element which encompasses the inspection glass, the projection face, and a support face for the projector and which fixes the deflection angle of the deflection mirror. Most desirably, in one preferred embodiment, the device is provided with a position abutment for the deflection mirror, while in another embodiment, the deflection mirror is a part of this inserted unitary elements.

Most advantageously, the support face for the projector is provided with an opening at the front side opposite to the deflection mirror to permit a passing of the projection rays toward the projection face. Preferably, this opening is traversed by two parallel lamellae which extend between the two side lateral edges of the opening, and which are inclined forwardly toward the deflection mirror so that they are disposed parallel to the path of the rays deflected downwardly and rearwardly from the deflection mirror. In a particularly advantageous embodiment, an intermediary bottom is provided beneath the projection face at least between the lower edge thereof and the front side of the housing, adjacent to the inspection glass, which is provided with air discharge openings. The housing is also preferably provided with air inlet openings beneath the projection face and with air outlet openings at the top side of the housing. In a further desirable embodiment, a blower is provided in the housing beneath the projection face, and a heating element is provided in the housing beneath the projection face in the flow path between the air inlet and air outlet openings thereof. Most advantageously, the blower and/or heating element are controlled by a thermostat within the housing. Preferably, the deflection mirror is disposed in the flow path between the air inlet and air outlet openings in such a manner that it is exposed to the air flow on both of its sides.

Finally, in a particularly preferred embodiment, a sound reproduction device, in particular a cassette recorder, is mounted beneath the projection face, and in close proximity to the front side of the housing, a loudspeaker is provided adjacent to sound apertures provided in the housing.

Other objects and features of the present invention will become apparent from the following detailed description considered in connection with the accompanying drawings which disclose the embodiment of the invention. It is to be understood, however, that the drawings are designed for the purpose of illustration only and not as a definition of the limits of the invention.

In the drawings, wherein similar reference characters denote similar elements throughout the several views:

FIG. 2 is a side sectional view in part elevation, of the projector shown in FIG. 1; and FIG. 3 is a schematically illustrated diapositive for the projector.

Figure 1:
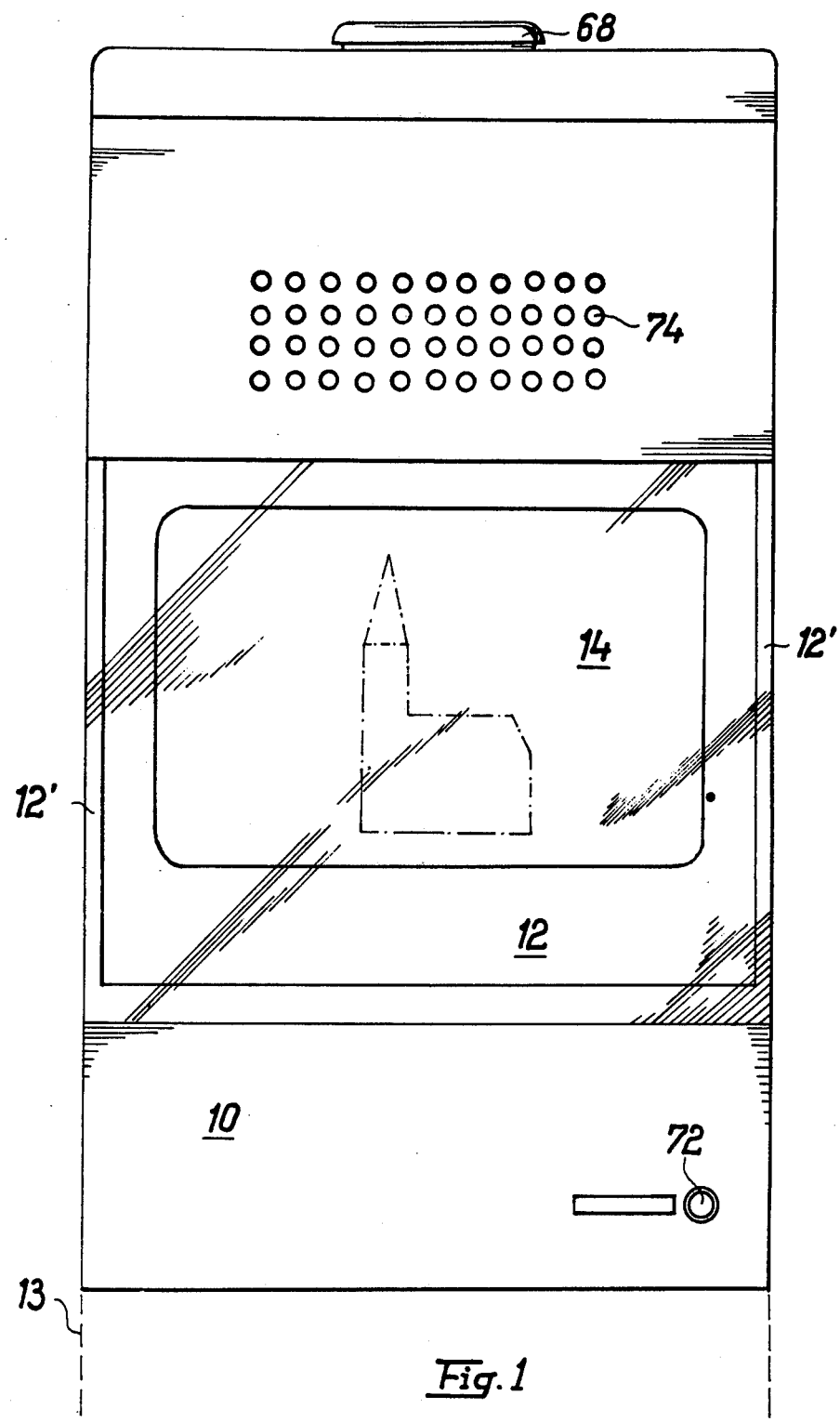
FIG. 1 is a front elevational view of a projector embodying the present invention.

As shown in the drawings, the projector essentially consists of a vertically-disposed, generally rectangular, hollow housing 10 which is provided with window openings at its front side 12 and also at its two side faces on regions 12'. Housing 10 may be placed onto a pedestal which may have different heights depending on the surrounding environment. Inside housing 10, adjacent to the rear side thereof, a projection face 14 is mounted. In the preferred arrangement of the projection face at eye level, the viewing zone is limited, as indicated by upper arrow A and lower arrow B. This viewing zone must be free of devices or elements which take part in the picture projection. These elements basically comprise a projector 16 and a deflection mirror 18 which diverts the path of rays emitted by projector 16 to projection face 14.

The projectors which are particularly advantageous for this purpose are projectors for projecting diapositives or slides and which operate in accordance with the so-called "chute" principle; the slides being carried in a magazine from which they successively drop into a projection chute. Projectors of this type may be mounted at a slight inclination so as to lower the direction of projection, furthermore, since deflection mirror 18 must be mounted above the viewing zone, the projection axis admits projection face 14 in downwardly inclined direction.

In order to prevent distortions of the picture and to prevent an impairment of the side ratio, the projection face heretofore has always been maintained in a vertical disposition with respect to the projection axis. However, in the subject device, such an arrangement would be disadvantageous because the projection face would be excessively inclined. Thus, in accordance with the subject invention, the projection axis 20 is directed obliquely with respect to the optical axis 22 of the projector lens in such a manner that the projection axis 20 declines more or is more downwardly inclined in the direction of deflection mirror 18 than the optical axis 22. This oblique angled projection is corrected in that the projection axis 20 is admitted onto the projection face 14 in a correspondingly oblique angled direction, whereby the inclination of the same can be kept essentially lower. In order to obtain this oblique angled projection the center of the picture Z to be projected is displaced from the optical lens axis 22 upwardly, as can be seen in FIG. 2. This is carried out, for example, by mounting a diapositive or slide negative of the size 24 × 36mm$^2$ in a diapositive or slide frame of 40 × 40mm$^2$ such that it is correspondingly displaced from the frame center. For example, in the shown structure of the device, a possible off center positioning of the diapositive by about 7mm, permits a lowering of the projection face, at a given inclination of the projection face, by about 100mm. Thereby sufficient height is gained, so as to position the projector 16 and deflection mirror 18 outside of the viewing zone. A correspondingly structured diapositive is shown in FIG. 3, whereby the reference numeral 24 designates the large size diapositive frame and the reference numeral 26 designates the smaller sized diapositive.

The oblique angled projecton demands high requirements with respect to the adjustment or positioning of projector 16, deflection mirror 18 and projection face 14. In order to achieve an exact picture projection, on the one hand, and to keep the manufacturing costs low, on the other hand, the device is provided with an insert 30 which is placed into housing 10 and is supported on lateral console bars 28 which are provided on housing 10, for example. Insert 30 may, for example, be made of acrylic plastic encompassing a front transparent inspection glass segment 32 and two lateral transparent inspection segments 32'. Insert 30 also includes a support bottom portion 34, a rear portion 36 with inserted projection face 14, for example, and an upper console-like section 38 which protrudes from the rear portion 36 in the direction of the upper edge 40 of inspection glass segment 32. The upper side of section 38 serves as a support face 42 for projector 16. A passage opening for the projection rays is provided between the upper segment 38 and the upper edge 40. In order to prevent viewing of projector 16, which would be observable by an upwardly-directed viewing angle required by children, for example, lamellae 46 may be placed into opening 44 which conform to the path of rays in that they are forwardly and upwardly slanted, thus running parallel with respect to the rays.

As shown in FIG. 2, in the proximity of edge 40, a positioning bar 48 is provided for supporting deflecton mirror 18 on insert 30. Alternatively, deflection mirror 18 may be a unitary member of insert 30.

Due to the provision of insert 30, all elements which contribute to generate the picture are all fixed in their position and angle of inclination, so that all required distances and angles can be maintained during assembly. Furthermore, due to insert 30, the housing portion which receives the path of rays is screened, whereby as a result of which touching of the specially-treated upper surface of projection face 14 is prevented. Also penetration of dust particles is minimized.

A thermostat 52 is mounted on an intermediary bottom portion 50 beneath insert 30 which controls a blower 54 which is mounted adjacent the front of the housing beneath passage openings 56 positioned in bottom portion 34 of insert 30. As a result, an air flow may be generated along the inner surface of inspection glass 32, preventing a fogging of the glass. Fresh air is also fed through an air inlet 58 which is covered by lamellae 60 and a dust sieve and a subsequent heating device 62. Due to the control by thermostat 52, the fresh air may be heated by heating element 62 if influenced by a cold environment. The air flows around a cassette recorder 64 providing the sound for the series of pictures.

In a housing cover 66 which facilitates access to projector 16, an air outlet is provided and screened by a cap 68. Not only does the air discharge from this outlet which is introduced by inlet opening 60 and which flows around deflection mirror 18, but also the cooling air for projector 16 which is introduced through a lamella grid 70.

A starting key 72 is provided beneath the window opening with inspection glass 32 at the front side of the housing (FIG. 1), while above the window opening, sound openings 72 are provided for a loud speaker (not shown) which is connected to the cassette recorder.

The described device provides, in addition to an attractive, simple structure, an extremely simple path of rays with only one deflection. A large face viewing zone is present on which a substantially distortion-free aximuthal projection picture may be viewed which is also free of lateral ratio changes. The upper housing portion which receives the projector 16 is also a screen against daylight. Insert 30 facilitates the assembly of the device, increases the precision of the projection, protects the projection face and is protected against fogging by an air and heating system. Furthermore, the air flow is guided to the deflection mirror which is also protected against fogging. The blower and heating system also permits placing of the device either in closed or indoor, or open or outdoor, places since the blower will prevent elevated operating temperatures due to heat influence generated by sunshine or the projection lamp, and since the heater will prevent the operating temperature to fall to an undesirably low temperature caused by the influence of cold air.

Instead of providing a large size diaposite frame with an eccentrically mounted diapositive, as shown in FIG. 3, an abutment may be provided in the picture chute of projector 16, which positions the diaposite in an eccentric position with respect to the optical lens axis 22, when it is moved from a magazine and into the picture chute. Hence, commercially-available magazines may be used and no specially prepared diapositives have to be used.

While only one embodiment of the present invention has been shown and described, it will be obvious to those skilled in the art that many changes and modifications may be made thereunto without departing from the spirit and scope of the invention.

What is claimed is:

1. A projection device for projecting a successive series of pictures comprising:
    a housing having front, rear, and side walls and at least one window opening provided in the front wall of said housing;
    a generally planar projection screen which is disposed closely adjacent to the rear wall of said housing and which can be viewed through said window opening, said screen being slanted upwardly and rearwardly toward said rear wall;
    a plastic unitary insert mounted with said housing which includes a transparent inspection window pane covering said window opening, an upper support face for supporting a projector, and a device for fixing a deflection mirror at a desired angle of deflection;
    a projector having a projection axis, a lens having an optic axis and a picture chute for the successive receipt therein of slides, said chute being mounted with an abutment which is adapted to retain the slide received therein in a projection position which is eccentric with respect to said optical axis of said lens, said projector being supported on said upper support face outside of the viewing range defined between said window opening and said projection screen and adjacent to said rear wall of said housing in such a manner that the path of rays emitted therefrom is directed towards the front wall of said housing, said optic axis of said lens and said projection axis being inclined downwardly and forwardly towards the front wall of said housing with said projection axis being inclined downwardly and forwardly at a greater angle than said optic axis; and
    a single deflection mirror disposed adjacent to said front wall of said housing above said window opening which is fixed at a desired angle of deflection by said device for fixing so as to deflect the rays emitted from said projector toward said projection screen.

2. The projector according to claim 1 wherein said window opening extends beyond the side edges of said front wall of the housing and into the side walls thereof.

3. The projector according to claim 2 wherein said window opening extends into said side walls to a point in close proximity to the plane of said projection screen.

4. The projector according to claim 1 wherein said device for fixing the deflection angle consists of a positioning abutment which supports said deflection mirror.

5. The projector according to claim 1 wherein said deflection mirror is a unitary member of said insert.

6. The projector according to claim 1 wherein said support face for said projector is provided with an opening at its front side opposite to deflection mirror to permit passing of the projection rays toward said projection screen.

7. The projector according to claim 6 whrein said support face opening is traversed by lamellae, said lamellae being inclined forwardly and upwardly in a parallel relationship relative to the path of rays deflected by said deflected mirror to permit passage of said rays therethrough toward said screen.

8. The projector according to claim 1 additionally including a top wall for said housing and an intermediary bottom wall disposed beneath said projection screen and extending at least between the lower edge thereof and the front wall of the housing adjacent to said inspection window pane, said bottom wall having air discharge openings formed therein and said housing having air inlet openings formed therein beneath said projection screen and said top wall having air outlet openings formed therein.

9. The projector according to claim 8, additionally including a blower disposed within said housing mounted beneath said projection screen.

10. The projector according to claim 9, additionally including a heating element disposed within said housing mounted beneath said projection screen in the flow path between said air inlet and air discharge openings.

11. The projector according to claim 10 additionally including a thermostat disposed within said housing and coupled to, and controlling operation of, said blower and said heating element.

12. The projector according to claim 8 wherein said deflection mirror is positioned in the flow path between said air inlet and air outlet openings.

13. The projector according to claim 1 wherein said front wall of said housing has at least one sound opening formed therein and said projector additionally includes a sound reproduction device mounted beneath said projection screen and loud speaker coupled to said sound reproduction device disposed closely adjacent to said front wall of said housing in the range of said sound opening formed therein.

14. The projector according to claim 13 wherein said sound reproduction device is a cassette recorder.

* * * * *